Jan. 4, 1966 M. KIDJEL 3,226,835
PROPORTIONAL CALIPERS
Filed May 24, 1963 3 Sheets-Sheet 1

INVENTOR.
MAURICE KIDJEL

BY *Kelman and Berman*

AGENTS

Jan. 4, 1966  M. KIDJEL  3,226,835
PROPORTIONAL CALIPERS

Filed May 24, 1963  3 Sheets-Sheet 2

*INVENTOR.*
MAURICE KIDJEL

BY *Kelman and Berman*

AGENTS

Jan. 4, 1966  M. KIDJEL  3,226,835
PROPORTIONAL CALIPERS

Filed May 24, 1963  3 Sheets-Sheet 3

INVENTOR.
MAURICE KIDJEL

BY *Kelman and Berman*

AGENTS

United States Patent Office 3,226,835
Patented Jan. 4, 1966

3,226,835
PROPORTIONAL CALIPERS
Maurice Kidjel, 1012 Piikoi St., Honolulu, Hawaii
Filed May 24, 1963, Ser. No. 283,053
2 Claims. (Cl. 33—150)

This invention relates to draftsman's instruments, and more particularly to proportional calipers.

I have found that double calipers having two pairs of points simultaneously movable toward and away from each other at a distance ratio of 1:5.33, or three to sixteen, permit the solving of geometrical problems heretofore considered insoluble, and is a particularly valuable tool for the artist depicting the human figure. Other applications of the fixed ratio calipers of the invention will readily suggest themselves to those skilled in the art.

The novel geometrical constructions which are possible with the cailpers of the invention additionally require the use of an ordinary compass and of a plain straightedge without markings. The accuracy of the results obtained depends on the quality of the tools employed, and particularly on the precise relationship of the spacings between the pairs of points on the calipers. While the spacing between the points of one pair must be generally three sixteenths of the spacing between the points of the other pair, this relationship should be accurate to at least three figures, and is preferably accurate to four figures. The ratio, therefore, should be 1:5.33, or preferably 1:5.333.

The object of the invention is the provision of calipers capable of fixedly maintaining the ratio of point distances at the desired value.

Other objects and many of the attendant advantages of this invention will be readily appreciated as the same becomes better understood by reference to the following detailed description when considered in connection with the accompanying drawings wherein.

Figure 1:
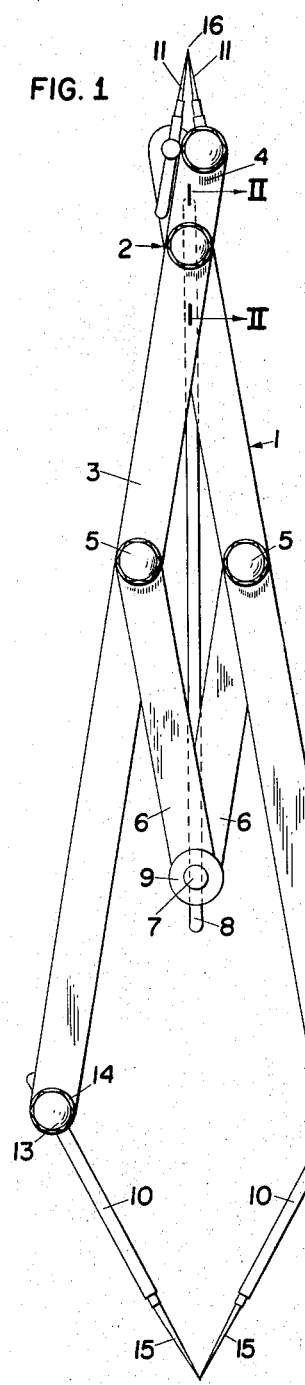
FIG. 1 shows a preferred embodiment of the proportional calipers of the invention in side elevation.
Figure 8:
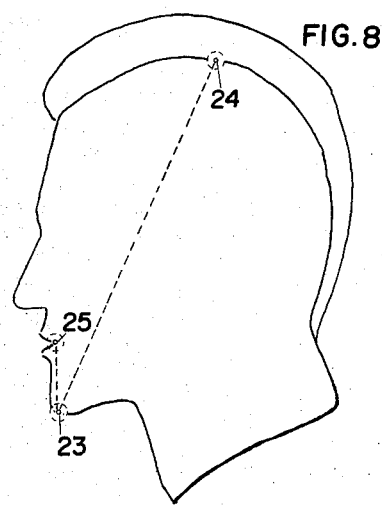
Figure 4:
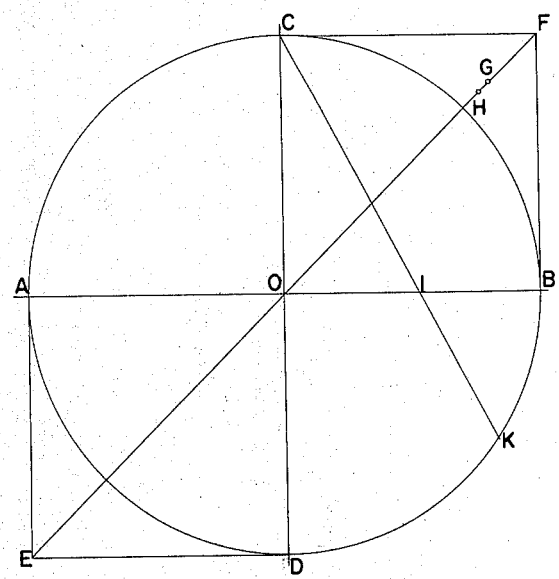
Figure 5:
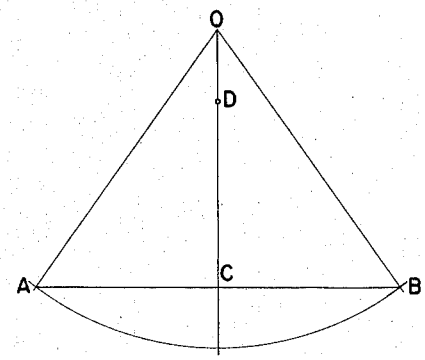
Figure 6:
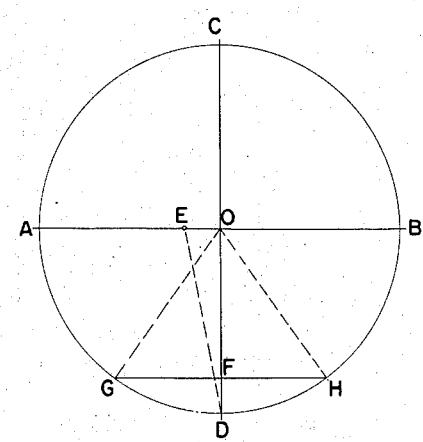
Figure 7:
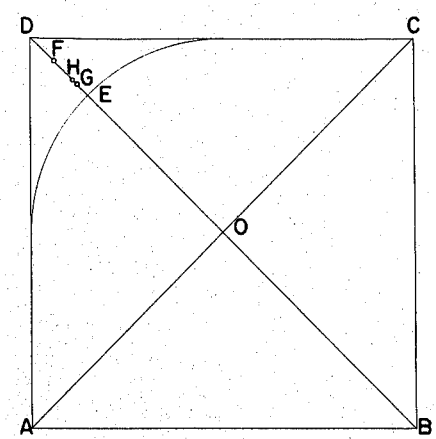

FIG. 4 diagrammatically illustrates the squaring of a circle with the calipers of the invention;

FIG. 5 shows the basic steps in constructing a regular pentagon by means of the calipers of FIG. 1;

FIG. 6 diagrammatically illustrates the solution to the problem of inscribing a regular pentagon to a given circle;

FIG. 7 shows how to find the side of a cube having twice the volume of a given cube; and FIG. 8 illustrates the use of the calipers in portrait drawing.

Referring initially to FIG. 1, there are shown calipers having two legs 1 connected by a pivot 2 the axis of which divides each of the legs 1 into a longer leg portion 3 and a shorter leg portion 4. Pivot pins 5 on the longer leg portions 3 at equal distances from the axis of the pivot 2 connect the legs 1 with links 6. The free ends of the links 6 are hingedly connected by a pin 7. The length of each link 6 between the axis of the hinge pin 7 and the axis of the associated pivot pin 5 is equal to the spacing between the last mentioned axis and that of the pivot 2.

One end of a cylindrical stem 8 is fastened to the pivot 2, and the other end of the stem 8 is longitudinally slidable in a radial passage in the hinge pin 7 between the two links 6. A knurled nut 9 threadedly mounted on a free end of the pin 7 permits the stem 8 to be releasably clamped between the free ends of the links 6.

Needles 10 are mounted on the long portions 3 of the legs 1, and needles 11 on the short leg portions 4. Each needle is mounted on a shoulder pin 12 the threaded part of which passes through an end portion of a leg 1, and which is secured to the leg portion by a cap nut 13 and lock washer 14. The needles are arranged on the legs 1 in such a manner that the points 15 of the neeedles 10 meet at a distance from the axis of the pivot 2 which is 5.333 times the distance of the axis of the pivot 2 from the contact point 16 of the needles 11.

Figure 2:
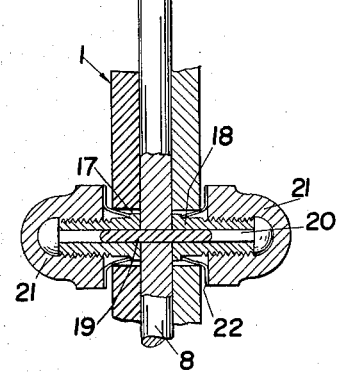
FIG. 2 shows a detail of the calipers of FIG. 1 in section on the line II—II.

Details of the pivot 2 and of adjacent parts of the legs 1 and of the stem 8 are shown in FIG. 2 in section on the pivot axis. The legs 1 have axially aligned cylindrical openings 17 which are engaged by a pivot pin assembly consisting of two axially terminal portions 18 and a connecting central portion 19. The terminal pin portions 18 are tubular, and the central pin portion 19 is fixedly fastened in the aligned cavities 20 of the terminal portions 18. The terminal portions 18 are axially spaced on the connecting portion 19. The stem 8 has a bore axially aligned with the cavities 20, and conformingly receives the central pin portion 19 in the bore. The terminal pin portions 18 abut against the stem 8 from opposite axial directions. The connecting pin portion 19 is preferably fastened to the terminal portions 18 and the stem 8 by a shrink fit, but may be fixedly fastened in any other desired manner.

The terminal pin portions 18 axially project from the cylindrical openings 17 in the legs 1 in opposite directions, and the projecting parts are threaded for mating engagement with cap nuts 21. A conically dished washer 22 is associated with each nut 21. The washer has a base portion in abutting contact with a radial face of the associated nut 21, and a conically tapering central portion which enters the corresponding opening or recess 17, and conformingly engages the wall of the recess under the pressure of the nut 21. The conical washer 22 has an axial opening precisely conforming to a cylindrical surface of the coordinated terminal pin portion 18, and thereby precisely locates the pivot axis with respect to each leg 1.

Figure 3:
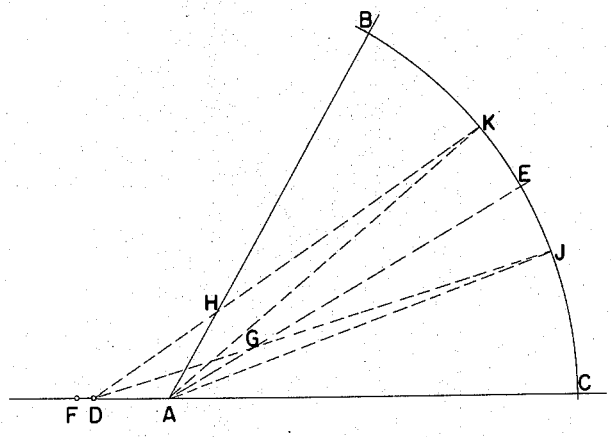
FIG. 3 is a diagram illustrating the use of the calipers of FIG. 1 for trisecting an angle or the arc of a circle.

Typical applications of the calipers shown in FIG. 1 are illustrated in FIGS. 3 to 8. Referring to FIG. 3, there is shown an angle BAC and an arc of a circle centered on point A and passing through points B and C. Using the calipers of FIG. 1, a compass, and an unmarked straightedge, the angle BAC and the arc BC may be trisected in the following manner:

The straight line AC is extended beyond A, and a line AE bi-secting the angle BAC and the arc BC is drawn in a conventional manner. The points 15 of the calipers are applied to A and C, and the point D is measured from A with the needles 11 of the calipers so that $\overline{AC}=5.33\times\overline{AD}$. The points 15 of the calipers are next applied to C and D, and the point F is found on the extended line AC with the needles 11 measuring from A. The distance CF is next spanned by the points 15, and the resulting spacing of the needles 11 is applied from A on the lines AB and AE to establish the points G and H. Straight lines drawn from D through G and H intersect the arc AB at K and J, and thereby trisect the arc. Lines AK and AJ may then be drawn to trisect the angle BAC.

The results obtained are as accurate as can be expected from any method of geometrical construction using drafting implements and a sheet of paper of reasonable dimensions. The method is applicable to angles up to about 135°. A method is readily devised for larger angles, and may be based on the known method of trisecting a right angle or any integral multiple thereof. When the results obtained by means of the calipers of the invention are checked against trigonometric calculations, the error is found to be a fraction of one degree.

The calipers of the invention may further be employed to square a circle, that is, to find the side of a square having the same area as a circle of known radius. The procedure to be followed will be described with reference to the diagram of FIG. 4.

Two diameters AB and CD are drawn through the center O of a circle at right angles. Tangents are drawn to the circle through the points A, B, C, D to establish two diagonally opposite corners E, F of a square circumscribed about the circle, and the diagonal EF is drawn through the center O.

The points 15 of the calipers are applied to O and F, and the spacing of the needles 11 is applied to the diagonal from F to locate the point G on the diagonal. The points 15 are next applied to the distance FG, and the needles 11 are used to find the point H on the diagonal by measuring from G. When the points 15 are then spread from E to H, and the resulting spacing of the caliper needles 11 is marked on the diameter AB from B, the point I is found. A line drawn from C through I and intersecting the circle at K is the desired side of a square practically equal in area with the circle.

When drawn with absolute precision, the length of the line CK will differ from the theoretical value by less than one part in four hundred, but such an error is normally smaller than that inherent in the tools employed.

The calipers of the invention make it easy to draw a regular pentagon when one side is given or when the radius of the circumscribed circle is known. FIG. 5 shows the method of drawing a regular pentagon having a side AB. A line perpendicular to the line AB is drawn in a conventional manner to bisect the line AB at C. The distance AC is marked on the perpendicular line from C to find the point D. The points 15 of the calipers are then applied to A and B, and the resulting spacing of the needles 11 is applied to the perpendicular line from D in a direction away from C to find the center O of a circle through A and B. The line AB is one side of the pentagon inscribed in the circle. The other three corners of the pentagon are then located on the circle in an obvious manner.

The arc of the circle about the center O which is subtended by the line AB has a length of approximately 72°2', and deviates from the theoretical value of 72° by an error too small to be measurable in normal drafting practice.

FIG. 6 will be referred to for illustrating the method of inscribing a pentagon into a given circle about the center O. Two diameters AB and CD are drawn through O at right angles to each other. The points 15 of the calipers are set to the radius of the circle, and the distance between the points of the caliper needles 11 determines the position of the point E on the diameter AB when applied from O. When the caliper points 15 are set to the distance DE, and the resulting spacing of the needles 11 is applied on the radius DO from D, the point F is found. A line drawn through F parallel to the diameter AB intersects the circle at G and H. GH is the desired side of the inscribed pentagon.

The arc subtended by the line GH is slightly more than 2' shorter than 72°, the theoretical length of the circular arc subtended by a side of the pentagon inscribed in the circle. The error is not normally measurable.

FIG. 7 shows how to double a cube using no other draftsman's tool than paper and pencil, a compass, an unmarked straightedge, and the proportional calipers of the invention.

A square ABCD is drawn to have a side equal to that of the cube whose volume is to be doubled. The diagonals AC and BD are drawn, and intersect at O. The distance OE is measured on the diagonal BD from O toward D to be equal to one half of the side of the square. The points 15 are applied to O and E, and the resulting spacing of the needles 11 is used to find point F on the diagonal BD, measuring from D.

The distance DE set between the points 15 gives a spacing of the needles 11 equal to the distance of point G from point E on diagonal BD. Setting the needles 10 on F and G, the point H is found by measuring with the needles 11 from G toward D. The distance BH is the side of the cube whose volume is twice the volume of a cube having the side AB.

The ratio of BH to AB differs from the theoretical value, the third root of 2, by approximately one part in one hundred thousand parts. Using the calipers of the invention, one can solve the "insoluble" problem of doubling a cube by means of a geometrical construction with a margin of error not greater than that inherent in an algebraic solution of the problem relying on five-place logarithm tables or their equivalent. It is evident that the precision of the geometrical solution will be determined solely by the width of pencil lines, by the precision of the implements employed, and by similar considerations as long as the construction is carried out on a surface of reasonable size.

I have discovered that many dimensions of the human body are related to each other by a ratio of three to sixteen, or by integral multiples of this ratio, and the calipers of the invention are very useful to the artist who wishes to show the human body in a realistic manner.

I have found that the distance between the tip of the chin, indicated at 23 in FIG. 8 of the drawing, and the crown 24 of the human head is related to the distance between the chin tip 23 and the meeting point 25 of the closed lips, as viewed in profile in FIG. 8, by the ratio of 5.33 to 1. This ratio is universal in all human races, in males and females, and is the same in all age groups above about ten years. It is not always found in obvious malformations, in heads deformed by accident at birth or later, or deformed by design, as is the custom among some primitive tribes.

Conventional proportional calipers have pivots for connecting the legs which are longitudinally movable relative to the legs. Even the best variable-ratio calipers that I have been able to find are useless for carrying out the geometrical constructions described hereinabove. While they may be set once for a desired spacing between the points of a pair of needles and for a ratio of 3:16 between the spacing of one pair and that of the other pair, it is not possible with even the best available conventional calipers to change the spacing of the needles while maintaining a precise ratio between the two needle spacings.

The calipers of the invention indefinitely maintain a precise ratio of 1:5.33 or even 1:5.333 when handled with reasonable care. The setting of the needles 10, 11 on the legs 1 requires the skill of an expert, and must not be disturbed during normal operation of the calipers. The pins 12 may be fixedly fastened to the legs 1 by means of metal-to-metal adhesives or by similar means to prevent even the slightest change in the position of the needles relative to the legs.

The pivot 2 is self-centering, and the precise position of the pivot axis with respect to the legs is maintained during relative pivotal movement of the legs 1 without any difficulty. Spring temper phosphor bronze is a suitable material for the dished washers 22. Bronze washers do not wear significantly over a very long period of use. The ratio of needle spacings can therefore be held constant with great precision over a very large number of measurements.

The pivot 2 can be adjusted to avoid any significant play between the pivotally engaged members. Equally precise connections must be provided by the pivot pins 5 and by the hinge pin 7. Conically dished washers are employed with the pins 5 and 7 for most precise alignment of connected elements in a manner evident from FIG. 2. With the pivot structure shown in FIG. 2 and high standards of workmanship, the calipers of the invention are capable of needle spacings having a reproducible ratio of 1:5.333.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What I claim and desire to be protected by Letters Patent of the United States is:

1. Proportional calipers comprising, in combination:
   (a) two elongated legs formed with respective recesses of circular cross section about a common axis transverse of the direction of elongation of said legs;
   (b) point means on the two longitudinal end portions of each leg;
   (c) fixed pivot means connecting said legs for movement of said point means toward and away from each other about said axis;
      (1) the spacing of said axis from one of the point means on each leg being three sixteenths of the spacing of said axis from the other point means on said leg;
   (d) a pivot spaced from said axis on each leg;
   (e) a link mounted on each pivot;
   (f) hinge means connecting respective portions of said links spaced from the corresponding pivots;
   (g) an elongated stem member formed with an axial bore therein; and
   (h) releasable means for preventing movement of said hinge means relative to said stem member, said pivot means including
      (1) an axially elongated pin member having a central portion conformingly received in said bore of the stem member and fixedly fastened to said stem member, respective portions of said pin member spaced from said central portion being received in said recesses of said legs for securing said stem member against longitudinal movement relative to said axis, and respective terminal portions of said pin member projecting from said recesses in opposite directions, said terminal portions being threaded,
      (2) a nut threadedly movable about said axis on each terminal portion, and
      (3) a washer having a base portion abutting against said nut and a conical portion tapering axially away from said base portion and conformingly engaging the recess in a respective one of said legs.

2. Calipers as set forth in claim 1, wherein said pivots and said hinge means have respective axes parallel to said common axis, the spacing of the axis of said hinge means from the axis of each of said pivots being equal to the spacing of the axis of said pivot means from the axis of each of said pivots.

References Cited by the Examiner

UNITED STATES PATENTS

| | | | |
|---|---|---|---|
| 479,329 | 7/1892 | Kolesch | 33—149 |
| 546,669 | 9/1895 | Kohler | 33—152 |
| 664,727 | 12/1900 | Day | 33—157 |
| 683,916 | 10/1901 | Dudley | 33—149 |
| 835,466 | 11/1906 | Prario | 33—150 |
| 2,487,451 | 11/1949 | Kurmer | 33—150 |

FOREIGN PATENTS

| | | |
|---|---|---|
| 649,886 | 9/1928 | France. |
| 44,741 | 9/1888 | Germany. |

ISAAC LISANN, *Primary Examiner.*